US012494589B2

(12) United States Patent
Fan et al.

(10) Patent No.: US 12,494,589 B2
(45) Date of Patent: Dec. 9, 2025

(54) LIQUID CRYSTAL ANTENNA AND COMMUNICATION DEVICE

(71) Applicants: Beijing BOE Technology Development Co., Ltd., Beijing (CN); BOE Technology Group Co., Ltd., Beijing (CN)

(72) Inventors: Xichao Fan, Beijing (CN); Yali Wang, Beijing (CN); Biqi Li, Beijing (CN); Feng Qu, Beijing (CN); Wei Li, Beijing (CN); Zongmin Liu, Beijing (CN); Junwei Guo, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 135 days.

(21) Appl. No.: 18/580,147

(22) PCT Filed: Jul. 5, 2022

(86) PCT No.: PCT/CN2022/103894
§ 371 (c)(1),
(2) Date: Jan. 17, 2024

(87) PCT Pub. No.: WO2023/005622
PCT Pub. Date: Feb. 2, 2023

(65) Prior Publication Data

US 2025/0112381 A1 Apr. 3, 2025

(30) Foreign Application Priority Data

Jul. 30, 2021 (CN) ........................ 202110871399.0

(51) Int. Cl.
*H01Q 21/06* (2006.01)
*H01Q 13/10* (2006.01)

(52) U.S. Cl.
CPC ......... *H01Q 21/061* (2013.01); *H01Q 13/106* (2013.01)

(58) Field of Classification Search
CPC ...... H01Q 21/061; H01Q 13/106; H01Q 3/44; H01Q 1/38
See application file for complete search history.

(56) References Cited

U.S. PATENT DOCUMENTS

2016/0241217 A1* 8/2016 Sazegar .............. G02F 1/13306
2018/0294557 A1 10/2018 Lu et al.
(Continued)

FOREIGN PATENT DOCUMENTS

CN 108563050 A 9/2018
CN 108808181 A 11/2018
CN 112768851 A 5/2021

OTHER PUBLICATIONS

PCT/CN2022/103894 international search report dated Sep. 20, 2022.

*Primary Examiner* — Seokjin Kim
(74) *Attorney, Agent, or Firm* — IPro, PLLC

(57) ABSTRACT

A liquid crystal antenna and a communication device. The liquid crystal antenna includes: a first substrate; a second substrate; a plurality of antenna structures; a grounding electrode located on the side of the second substrate away from the antenna structures; each antenna structure includes a first microstrip line, a second microstrip line, and a liquid crystal layer, the first microstrip line includes first sub-microstrip lines and second sub-microstrip lines connected to the first sub-microstrip lines, the second microstrip line includes third sub-microstrip lines and fourth sub-microstrip lines connected to the third sub-microstrip lines, the first sub-microstrip lines and the third sub-microstrip lines all extend in a first direction and is arranged in a second direction, the orthographic projection of the liquid crystal
(Continued)

layer covers at least part of the area of the orthographic projection of the first sub-microstrip lines and the orthographic projection of the plurality of third sub-microstrip lines.

19 Claims, 16 Drawing Sheets

(56) References Cited

U.S. PATENT DOCUMENTS

| | | | | |
|---|---|---|---|---|
| 2021/0080765 | A1 | 3/2021 | Hu et al. | |
| 2021/0135327 | A1 | 5/2021 | Wang et al. | |
| 2021/0376434 | A1* | 12/2021 | Li | H01P 1/184 |
| 2022/0045413 | A1* | 2/2022 | Jia | H01P 1/2039 |
| 2024/0186670 | A1* | 6/2024 | Tang | G02F 1/134309 |
| 2025/0079673 | A1* | 3/2025 | Ding | H01P 1/18 |

* cited by examiner

LIQUID CRYSTAL ANTENNA AND COMMUNICATION DEVICE

CROSS REFERENCE TO RELATED APPLICATIONS

The present disclosure is a national phase entry under 35 U.S.C § 371 of International Application No. PCT/CN2022/103894, filed on Jul. 5, 2022, which claims the priority to Chinese Patent Application No. 202110871399.0, filed with the China National Intellectual Property Administration on Jul. 30, 2021 and entitled "LIQUID CRYSTAL ANTENNA AND COMMUNICATION DEVICE", which is incorporated in its entirety herein by reference.

TECHNICAL FIELD

The present disclosure relates to the 1 field of display technologies, and in particular to a liquid crystal antenna and a communication device.

BACKGROUND

In the era of 5th generation wireless systems (5G), wide band coverage, numerous antennas and a full screen are expected from a mobile phone terminal. Consequently, a clearance region in a mobile phone will be compressed and antenna design difficulty will be increased. A planar film antenna, thin in appearance, is potentially applicable to a narrow mobile phone space. In addition, a liquid crystal, a type of passive microwave-tunable technology, is able to continuously reconfigure resonant frequency of the antenna, and has a lower bias voltage and a wider tuning range compared with other tuning technologies. In a 5G terminal device, an antenna with a liquid crystal frequency reconfigurable can also function as an antenna tuner and a switch apart from an antenna. Accordingly, antenna design difficulty and cost are remarkably reduced.

SUMMARY

A liquid crystal antenna is provided in embodiments of the present disclosure. The liquid crystal antenna includes:

- a first substrate;
- a second substrate arranged opposite the first substrate;
- a plurality of antenna structures arranged in an array and disposed between the first substrate and the second substrate; and
- a grounding electrode disposed at a side of the second substrate facing away from the antenna structures.

Where each of the plurality of antenna structures includes: a first microstrip line, a second microstrip line disposed at a side of the first microstrip line close to the first substrate, and a liquid crystal layer disposed between the first microstrip line and the second microstrip line; the first microstrip line includes: a plurality of first microstrip sub-lines and a second microstrip sub-line connected with the plurality of first microstrip sub-lines; the second microstrip line includes: a plurality of third microstrip sub-lines and a fourth microstrip sub-line connected with the plurality of third microstrip sub-lines; the plurality of first microstrip sub-lines and the plurality of third microstrip sub-lines extend in a first direction and are arranged in a second direction, and the first direction intersects with the second direction; an orthographic projection of the liquid crystal layer on the second substrate covers at least part of regions of orthographic projections of the plurality of first microstrip sub-lines on the second substrate and at least part of regions of orthographic projections of the plurality of third microstrip sub-lines on the second substrate; and in the first direction, at least part of a region of an orthographic projection of the second microstrip sub-line on the second substrate and at least part of a region of an orthographic projection of the fourth microstrip sub-line on the second substrate are disposed at two sides of the orthographic projection of the liquid crystal layer on the second substrate, respectively.

In some embodiments, the grounding electrode is electrically connected with the first microstrip line.

In some embodiments, the plurality of first microstrip sub-lines and the plurality of third microstrip sub-lines are alternately arranged in the second direction; and

- the orthographic projections of the first microstrip sub-lines on the second substrate do not overlap the orthographic projections of the third microstrip sub-lines on the second substrate.

In some embodiments, the orthographic projections of the first microstrip sub-lines on the second substrate do not overlap the orthographic projection of the fourth microstrip sub-line on the second substrate, and the orthographic projections of the third microstrip sub-lines on the second substrate do not overlap the orthographic projection of the second microstrip sub-line on the second substrate.

In some embodiments, the orthographic projection of the liquid crystal layer on the second substrate does not overlap the orthographic projection of the second microstrip sub-line on the second substrate and the orthographic projection of the fourth microstrip sub-line on the second substrate, and the orthographic projections of the first microstrip sub-lines on the second substrate and the orthographic projections of the third microstrip sub-lines on the second substrate fall within the orthographic projection of the liquid crystal layer on the second substrate.

In some embodiments, orthographic projections of some of the first microstrip sub-lines on the second substrate overlap the orthographic projection of the fourth microstrip sub-line on the second substrate; and

- orthographic projections of some of the third microstrip sub-lines on the second substrate overlap the orthographic projection of the second microstrip sub-line on the second substrate.

In some embodiments, the orthographic projection of the first microstrip sub-line on the second substrate is connected with orthographic projections of two adjacent third microstrip sub-lines on the second substrate.

In some embodiments, the first microstrip sub-lines and the third microstrip sub-lines are arranged in parallel in the first direction; and the orthographic projections of the first microstrip sub-lines on the second substrate overlap the orthographic projections of the third microstrip sub-lines on the second substrate.

In some embodiments, the antenna structure further includes a first insulation layer; and the first insulation layer is disposed between the liquid crystal layer and the first microstrip line, or the first insulation layer is disposed between the liquid crystal layer and the second microstrip line.

In some embodiments, the second microstrip sub-line and the fourth microstrip sub-line are in a non-rectilinear shape; and the second microstrip sub-line is bent towards a side where the first microstrip sub-lines is located, and the fourth microstrip sub-line is bent towards a side where the third microstrip sub-lines is located.

In some embodiments, the orthographic projection of the liquid crystal layer on the second substrate overlaps the orthographic projection of the second microstrip sub-line on the second substrate and the orthographic projection of the fourth microstrip sub-line on the second substrate.

In some embodiments, a width of the first microstrip sub-lines is equal to a width of the third microstrip sub-lines in the second direction.

In some embodiments, a width of the first microstrip sub-lines is greater than a width of the third microstrip sub-lines in the second direction.

In some embodiments, a width of the first microstrip sub-lines is smaller than a width of the third microstrip sub-lines in the second direction.

In some embodiments, a length of the first microstrip sub-lines is equal to a length of the third microstrip sub-lines in the first direction.

In some embodiments, the antenna structure further includes: an encapsulation structure for defining a region where the liquid crystal layer is located and disposed between the first substrate and the second substrate.

The embodiments of the present disclosure provide a communication device, and the communication device includes the liquid crystal antenna according to the embodiments of the present disclosure.

BRIEF DESCRIPTION OF FIGURES

In order to describe the technical solutions in embodiments of the present disclosure more clearly, the drawings required for describing the embodiments are briefly described below. Obviously, the drawings in the following description are merely some embodiments of the present disclosure. Those of ordinary skill in the art can also derive other drawings from these drawings without making creative efforts.

DETAILED DESCRIPTION

Figure 1:
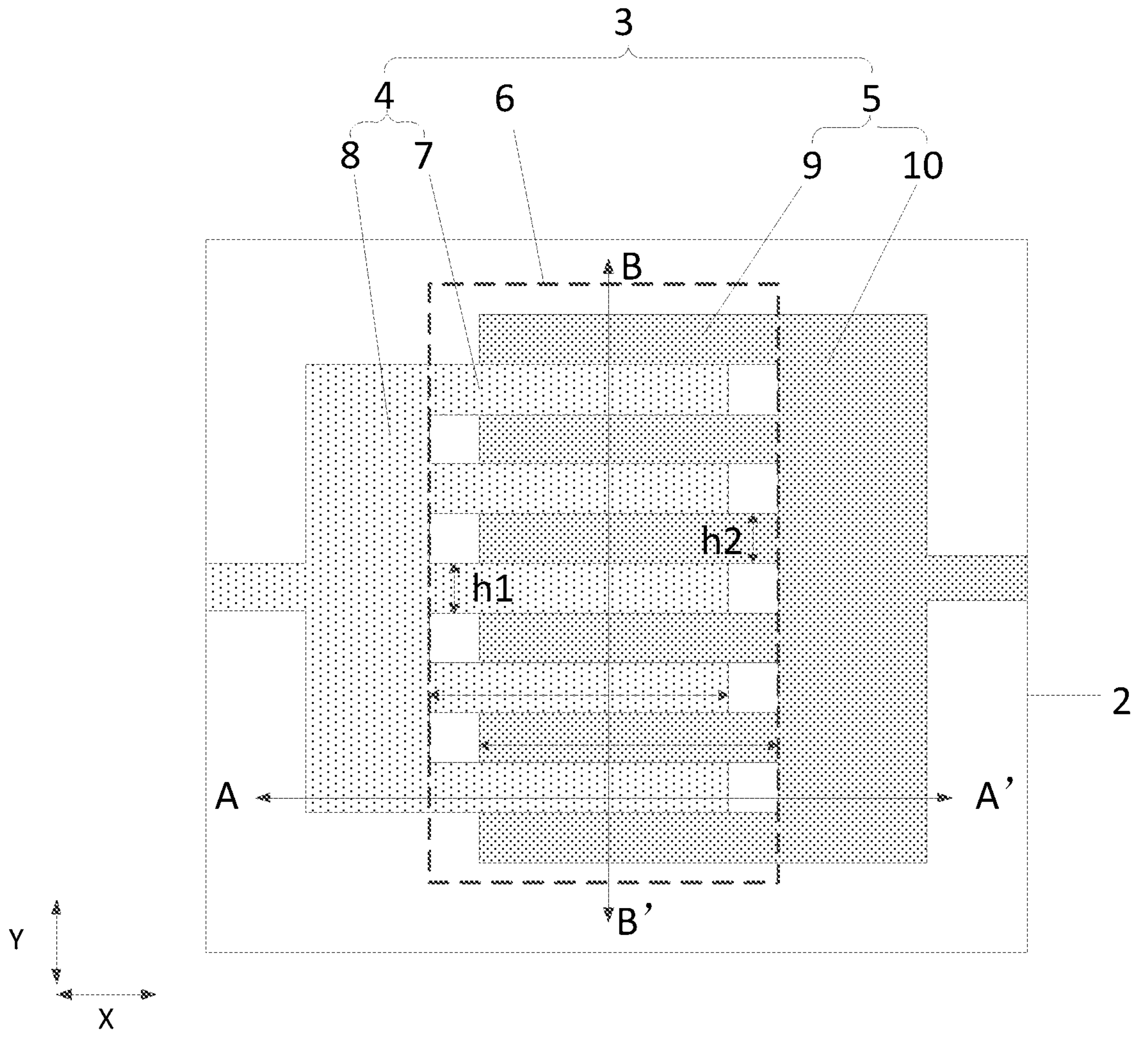
FIG. 1 is a schematic structural diagram of a liquid crystal antenna according to an embodiment of the present disclosure.

In order to make the objectives, technical solutions, and advantages in embodiments of the present disclosure clearer, the technical solutions in the embodiments of the present disclosure will be described clearly and completely in conjunction with the drawings in the embodiments of the present disclosure. Obviously, the described embodiments are some embodiments rather than all embodiments of the present disclosure. The embodiments of the present disclosure and features in the embodiments can be combined with one another without conflict. Based on the described embodiments of the present disclosure, all other embodiments derived by those of ordinary skill in the art without making creative efforts fall within the scope of protection of the present disclosure.

Unless otherwise defined, technical or scientific terms used in the present disclosure should have the ordinary meanings as understood by those of ordinary skill in the art to which the present disclosure pertains. Words "first", "second", etc. used in the present disclosure are merely used to distinguish between different components, instead of denoting any order, quantity or importance. Words "comprise", "include" and similar words mean that elements or items before the word encompass elements or items listed after the word and their equivalents, but do not exclude other elements or items. Words "connection", "connected", etc. are not restricted to physical or mechanical connections, but can include electrical connections, no matter direct or indirect.

It should be noted that sizes and shapes of all graphs in the accompanying drawings do not reflect true scales, and are merely to illustrate contents of the present disclosure. Moreover, the same or similar reference numerals denote the same or similar elements or elements having the same or similar function throughout.

Embodiments of the present disclosure provides a liquid crystal antenna, as shown in FIG. 1, the liquid crystal antenna includes:

a first substrate 1;

a second substrate 2 arranged opposite the first substrate 1; and a plurality of antenna structures 3 arranged in an array and disposed between the first substrate 1 and the second substrate 2; where each of the plurality of antenna structures 3 includes: a first microstrip line 4, a second microstrip line 5 disposed at a side, close to the first substrate 1, of the first microstrip line 4, and a liquid crystal layer 6 disposed between the first microstrip line 4 and the second microstrip line 5; the first microstrip line 4 includes: a plurality of first microstrip sub-lines 7 and a second microstrip sub-line 8 connected with the plurality of first microstrip sub-lines 7; the second microstrip line 5 includes: a plurality of third microstrip sub-lines 9 and a fourth microstrip sub-line 10 connected with the plurality of third microstrip sub-lines 9; the plurality of first microstrip sub-lines 7 and the plurality of third microstrip sub-lines 9 extend in a first direction X and are arranged in a second direction Y, and the first direction X intersects with the second direction Y; an orthographic projection of the liquid crystal layer 6 on the second substrate 2 covers at least part of regions of orthographic projections of the plurality of first microstrip sub-lines 7 on the second substrate 2 and at least part of regions of orthographic projections of the plurality of third microstrip sub-lines 9 on the second substrate 2; and in the first direction X, at least part of a region of an orthographic projection of the second microstrip sub-line 8 on the second substrate 2 and at least part of a region of an orthographic projection of the fourth microstrip sub-line 10 on the second substrate 2 are disposed at two sides of the orthographic projection of the liquid crystal layer 6 on the second substrate 2, respectively; and a grounding electrode 11 disposed at a side of the second substrate 2 facing away from the antenna structures 3.

In the liquid crystal antenna according to the embodiments of the present disclosure, in each antenna structure, at least part of the regions of the orthographic projections of the plurality of first microstrip sub-lines on the second substrate and at least part of the regions of the orthographic projections of the plurality of third microstrip sub-lines on the second substrate are covered by the orthographic projection of the liquid crystal layer on the second substrate. Moreover, in the first direction, the second microstrip sub-line connected with the plurality of first microstrip sub-lines and the fourth microstrip sub-line connected with the plurality of third microstrip sub-lines are located at two sides of the liquid crystal layer, respectively, that is, the first microstrip line and the second microstrip line are plugged into each other. During specific implementation, when a voltage is applied to the first microstrip line and the second microstrip line, an electric field formed between the plurality of first microstrip sub-lines and the plurality of third microstrip sub-lines may control a liquid crystal in the liquid crystal layer to move directionally, and a dielectric constant of the liquid crystal can be changed by adjusting a magnitude of the applied voltage. Accordingly, a resonant frequency of the antenna structure can be changed to realize an effect of a shiftable frequency, and a continuously reconfigurable resonant frequency of the liquid crystal antenna can be realized.

Figure 2:
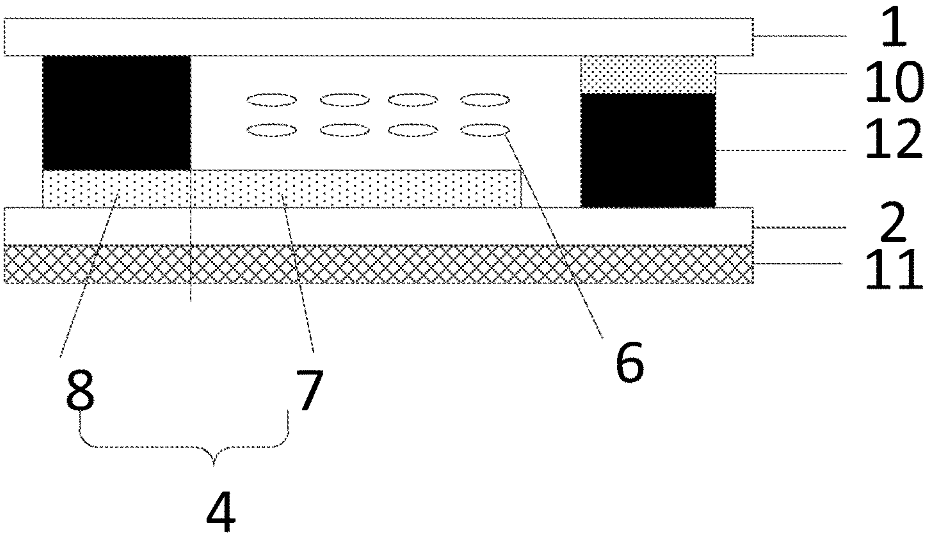
FIG. 2 is a sectional view along AA' in FIG. 1 according to an embodiment of the present disclosure.
Figure 3:
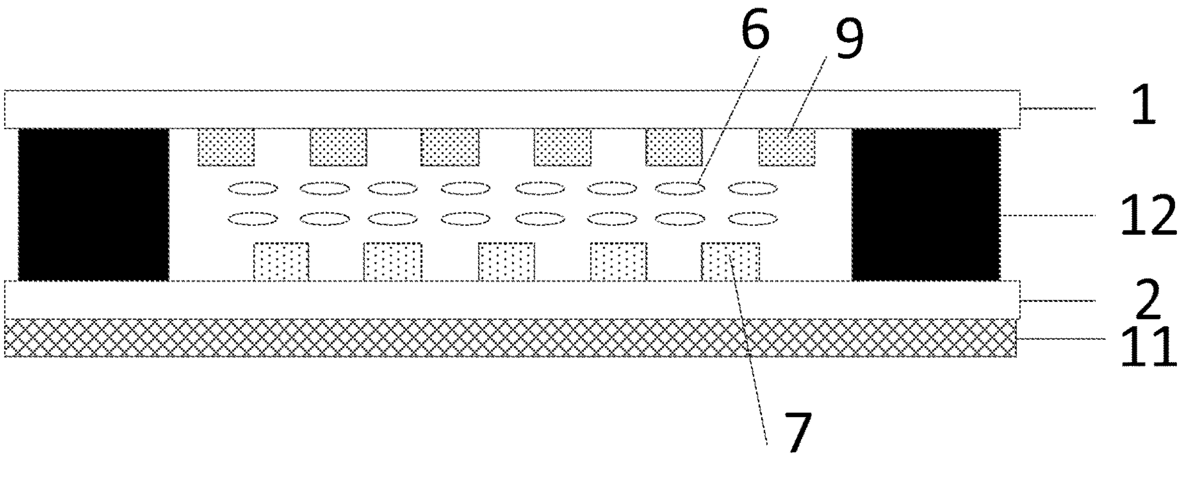
FIG. 3 is a sectional view along BB' in FIG. 1 according to an embodiment of the present disclosure.

It should be noted that only one antenna structure is shown in FIG. 1. FIG. 2 may be, for example, a sectional view along AA' in FIG. 1, and FIG. 3 may be, for example, a sectional view along BB' in FIG. 1.

In some embodiments, the grounding electrode is electrically connected with the first microstrip line.

In some embodiments, the first substrate and the second substrate are flexible substrates. The flexible substrates may be, for example, flexible circuit boards. The second substrate is provided with a plurality of blind holes, and the grounding electrode is electrically connected with the first microstrip line through the blind holes.

During specific implementation, a direct current bias voltage may be provided for the second microstrip line, and a radio frequency voltage may be provided for the grounding electrode. When the radio frequency voltage and the direct current bias voltage are loaded on the grounding electrode and the second microstrip line respectively, electric fields may be generated between an upper surface and a lower surface of the liquid crystal layer. Therefore, the dielectric constant of the liquid crystal is changed, and a resonant point of the antenna structure is changed to a frequency of an input radio frequency signal, so as to radiate the signal, and realize an effect of a reconfigurable frequency.

In some embodiments, as shown in FIG. 1, the plurality of first microstrip sub-lines 7 and the plurality of third microstrip sub-lines 9 are alternately arranged in the second direction Y; and the orthographic projections of the first microstrip sub-lines 7 on the second substrate 2 do not overlap the orthographic projections of the third microstrip sub-lines 9 on the second substrate 2.

It should be noted that in the liquid crystal antenna, the first substrate and the second substrate are the flexible substrates, and a distance between the first substrate and the second substrate is small. In this way, when the liquid crystal antenna jitters, the microstrip lines on an upper side and a lower side of the liquid crystal layer are likely to be short-circuited after making contact with each other.

In the liquid crystal antenna according to the embodiment of the present disclosure, for each antenna structure, the orthographic projections of the first microstrip sub-lines on the second substrate do not overlap the orthographic projections of the third microstrip sub-lines on the second substrate. Therefore, even if the liquid crystal antenna jitters, the first microstrip sub-lines do not make contact with the third microstrip sub-lines, so that the first microstrip sub-lines and the third microstrip sub-lines can be prevented from being short-circuited.

In some embodiments, as shown in FIG. 1, the orthographic projections of the first microstrip sub-lines 7 on the second substrate 2 do not overlap the orthographic projection of the fourth microstrip sub-line 10 on the second substrate 2, and the orthographic projections of the third microstrip sub-lines 9 on the second substrate 2 do not overlap the orthographic projection of the second microstrip sub-line 8 on the second substrate 2.

That is, the first microstrip sub-lines and the third microstrip sub-lines are arranged in an area between the second microstrip sub-line and the fourth microstrip sub-line. That is, as shown in FIG. 1, an orthographic projection of the first microstrip line 4 on the second substrate 2 does not overlap an orthographic projection of the second microstrip line 5 on the second substrate 2. Therefore, the situation that the first microstrip line and the second microstrip line are short-circuited due to contact with each other when the liquid crystal antenna jitters can be avoided, and normal work of the liquid crystal antenna can be ensured.

When the first microstrip sub-lines 7 and the third microstrip sub-lines 9 are arranged in the area between the second microstrip sub-line 8 and the fourth microstrip sub-line 10, in some embodiments, as shown in FIG. 1, the orthographic projection of the liquid crystal layer 6 on the second substrate 2 does not overlap the orthographic projection of the second microstrip sub-line 8 on the second substrate 2 and the orthographic projection of the fourth microstrip sub-line 10 on the second substrate 2, and the orthographic projections of the first microstrip sub-lines 7 on the second substrate 2 and the orthographic projections of the third microstrip sub-lines 9 on the second substrate 2 fall within the orthographic projection of the liquid crystal layer 6 on the second substrate.

In some embodiments, as shown in FIG. 1, the orthographic projection of the liquid crystal layer 6 on the second substrate 2 is connected with the orthographic projection of the second microstrip sub-line 8 on the second substrate 2, and the orthographic projection of the liquid crystal layer 6 on the second substrate 2 is connected with the orthographic projection of the fourth microstrip sub-line 10 on the second substrate 2.

When the plurality of first microstrip sub-lines and the plurality of third microstrip sub-lines are alternately arranged in the second direction Y, and the orthographic projections of the first microstrip sub-lines on the second substrate do not overlap the orthographic projections of the third microstrip sub-lines on the second substrate, in some embodiments, as shown in FIG. 1, an orthographic projections of a first microstrip sub-line 7 on the second substrate 2 is connected with orthographic projections of two adjacent third microstrip sub-lines 9 on the second substrate 2.

In some embodiments, as shown in FIG. 1, a width h1 of the first microstrip sub-lines 7 is equal to a width h2 of the third microstrip sub-lines 9 in the second direction Y.

Figure 4:
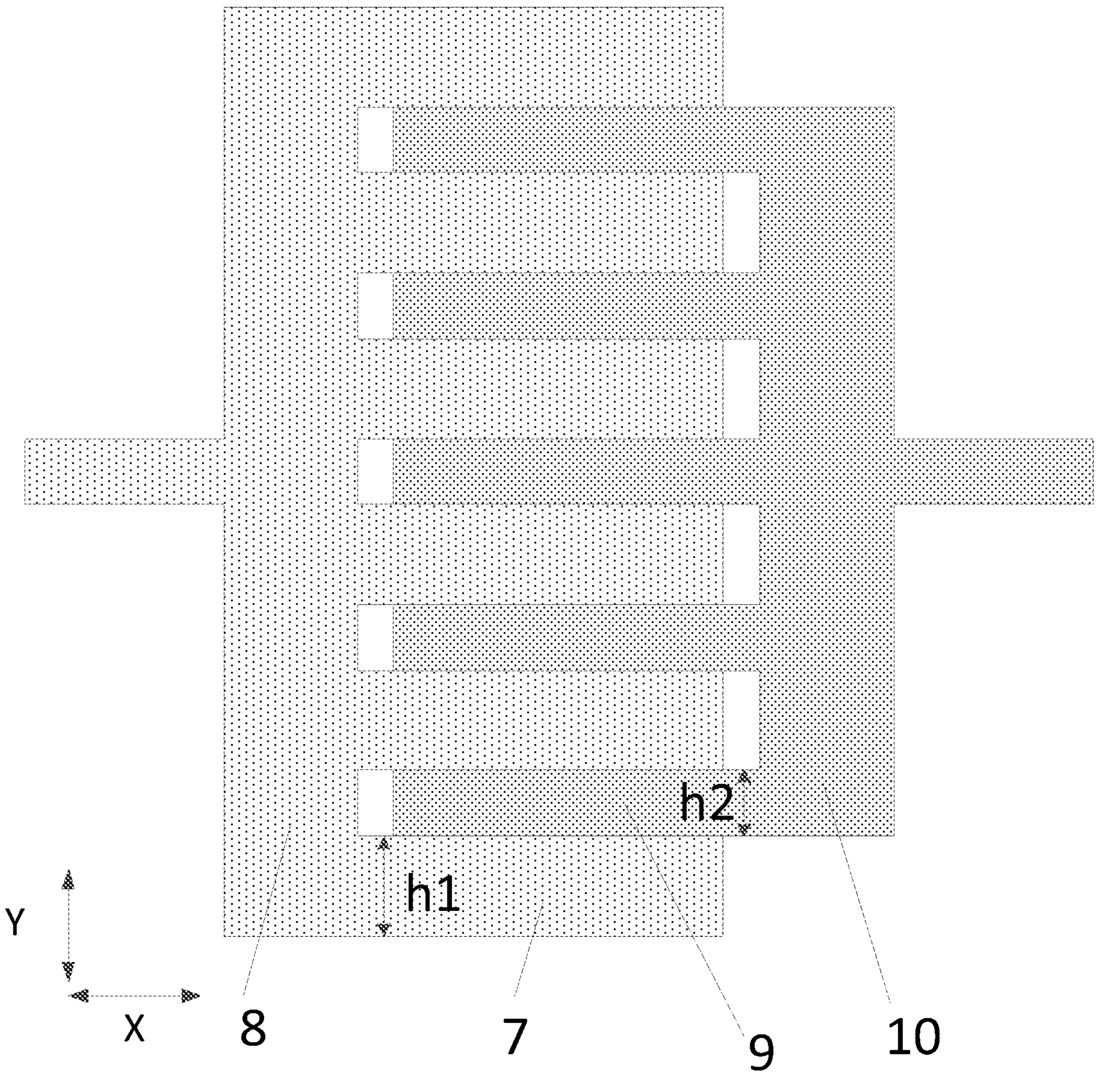
FIG. 4 is a schematic structural diagram of another liquid crystal antenna according to an embodiment of the present disclosure.
Figure 5:
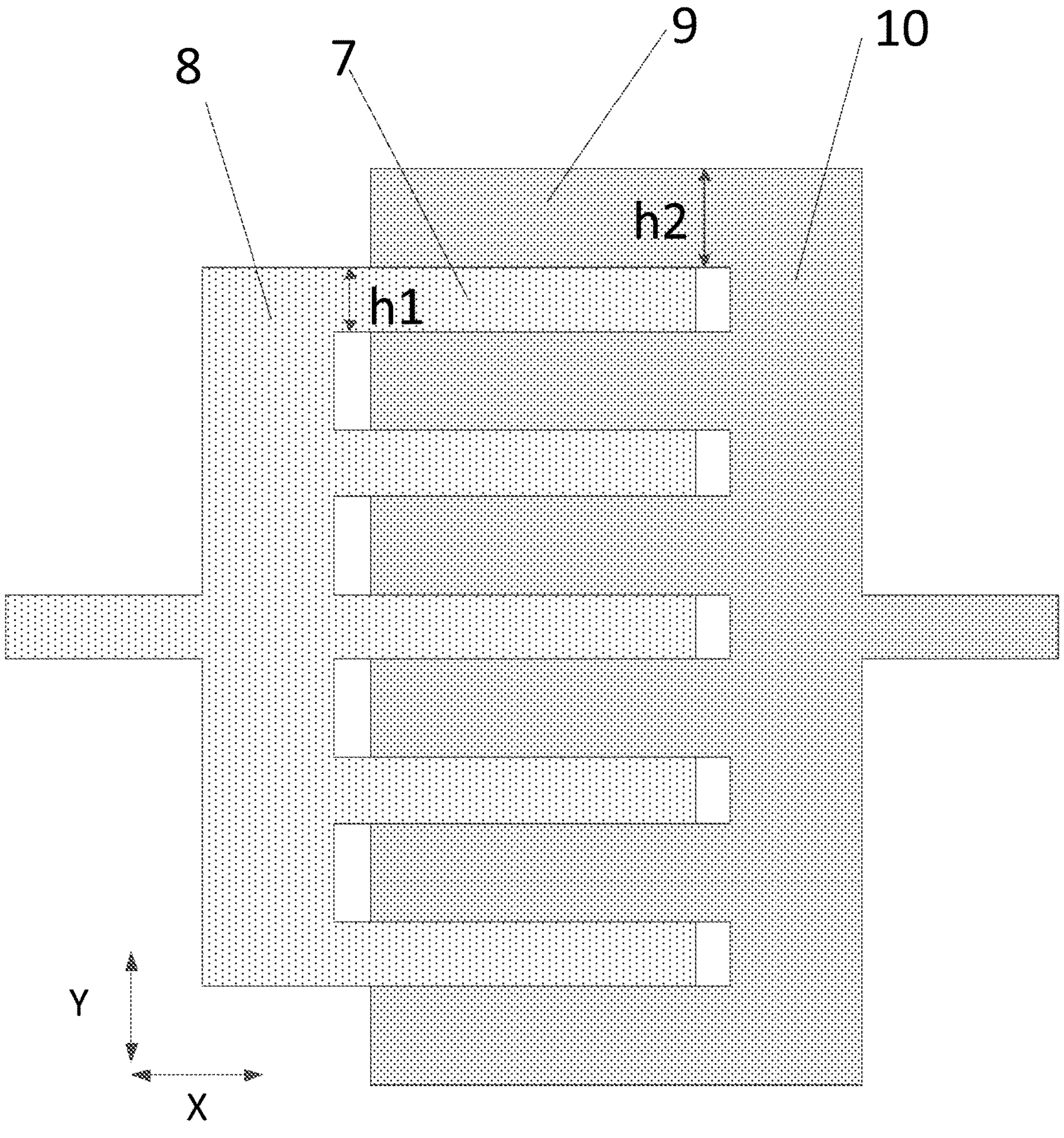
FIG. 5 is a schematic structural diagram of yet another liquid crystal antenna according to an embodiment of the present disclosure.

Certainly, in some embodiments or as shown in FIGS. 4 and 5, the width h1 of the first microstrip sub-lines 7 is not equal to the width h2 of the third microstrip sub-lines 9 in the second direction Y.

In some embodiments, as shown in FIG. 4, the width h1 of the first microstrip sub-lines 7 is greater than the width h2 of the third microstrip sub-lines 9 in the second direction Y.

In some embodiments, as shown in FIG. 5, the width h1 of the first microstrip sub-lines 7 is smaller than the width h2 of the third microstrip sub-lines 9 in the second direction Y.

It should be noted that during specific implementation, a frequency range of the liquid crystal antenna can be changed by adjusting the widths/width of the first microstrip sub-lines and/or the third microstrip sub-lines in the antenna structure.

Figure 6:
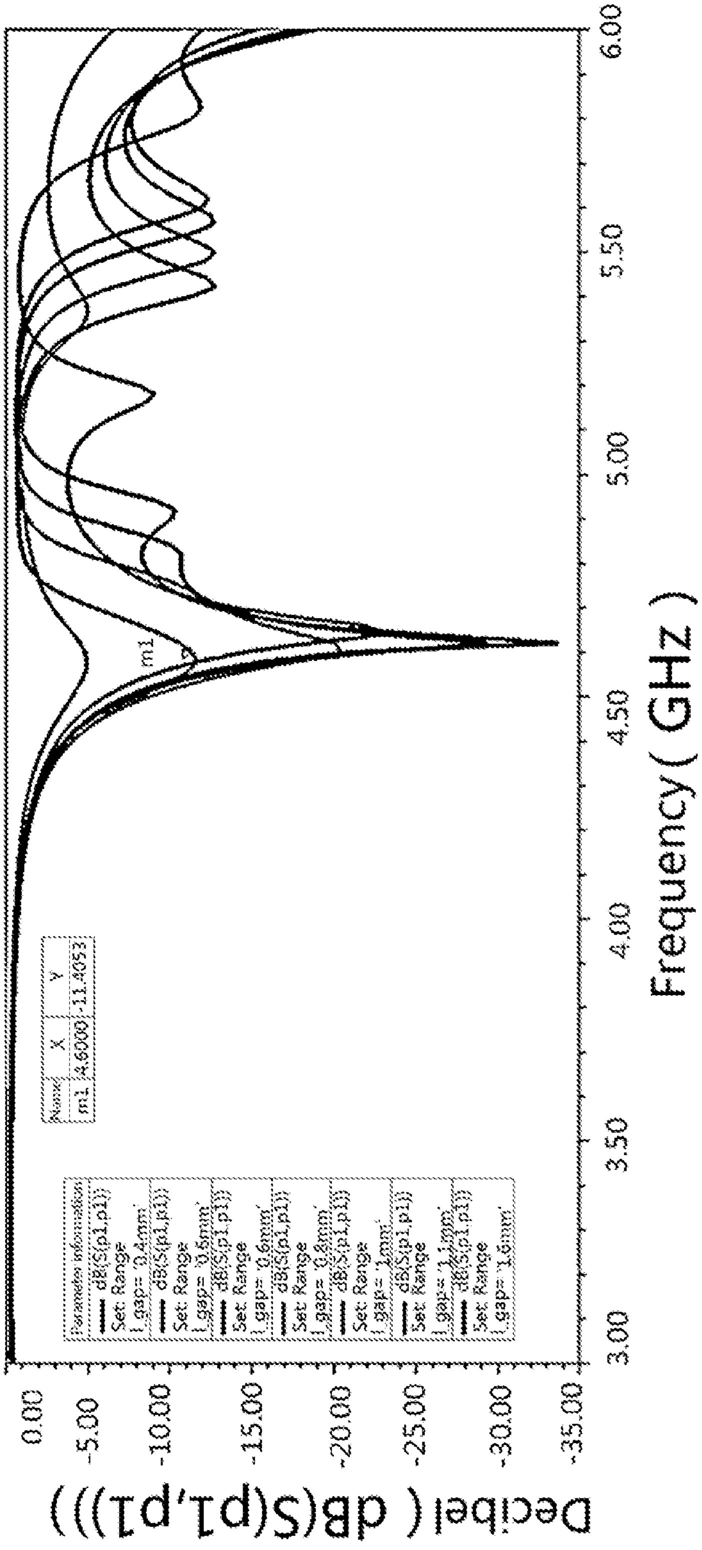
FIG. 6 is a spectrogram of liquid crystal antennas according to embodiments of the present disclosure.
Figure 7:
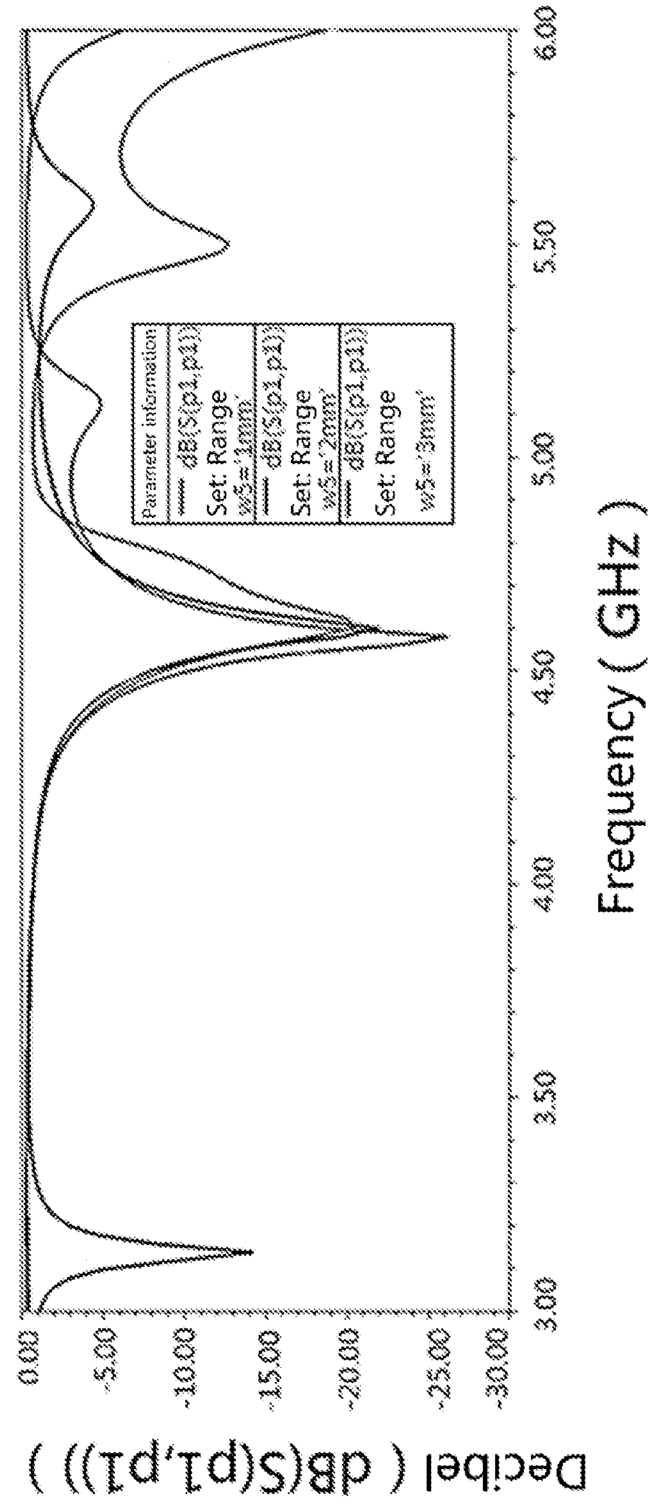
FIG. 7 is another spectrogram of liquid crystal antennas according to embodiments of the present disclosure.
Figure 8:
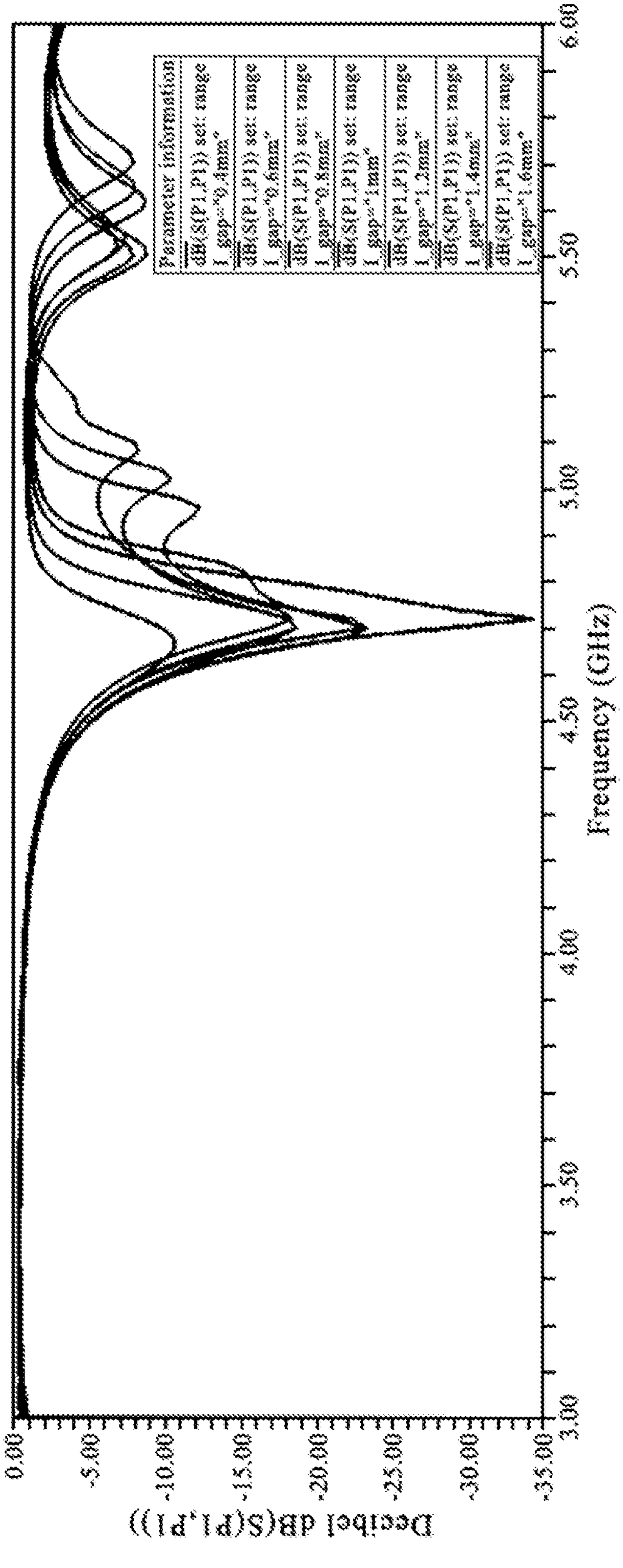
FIG. 8 is yet another spectrogram of liquid crystal antennas according to embodiments of the present disclosure.
Figure 9:
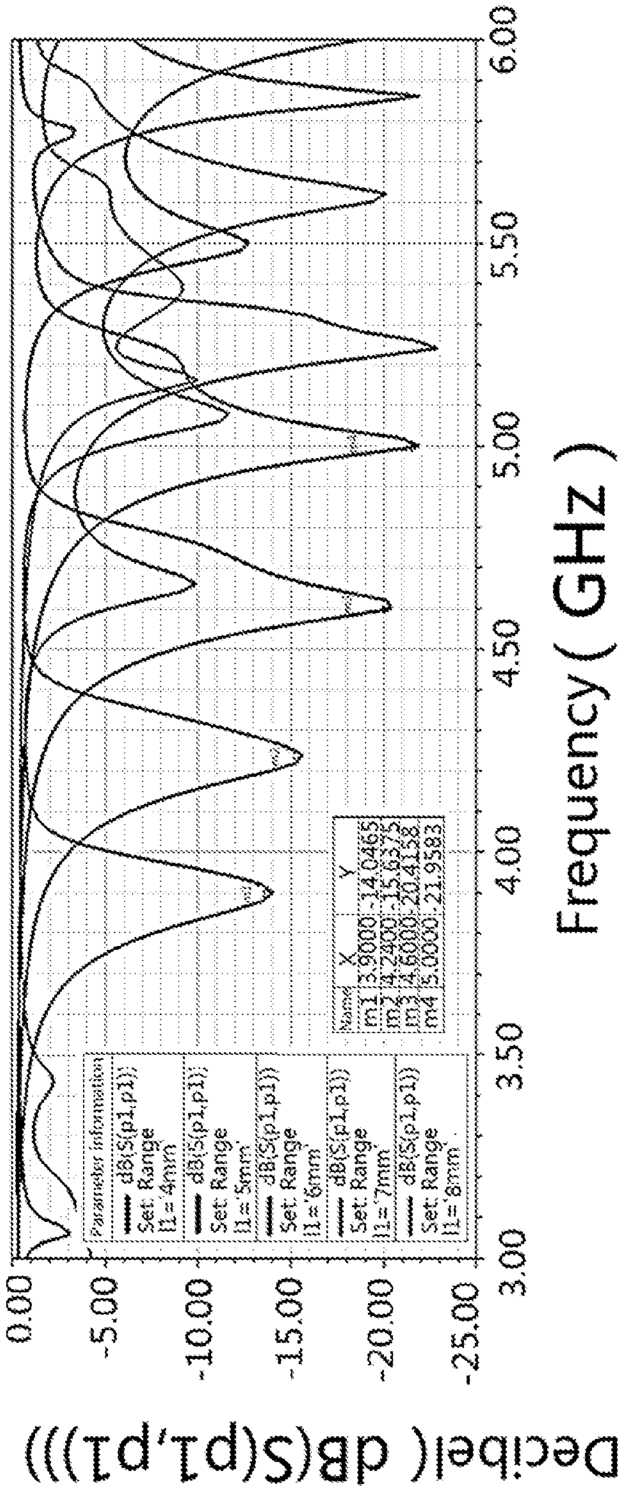
FIG. 9 is yet another spectrogram of liquid crystal antennas according to embodiments of the present disclosure.

Next, analogue simulation is performed on the liquid crystal antenna according to the embodiments of the present disclosure. Spectrograms are as shown in FIGS. 6-9. FIGS. 6, 7, and 8 are sweep parameter diagrams of liquid crystal antenna structures. FIG. 6 corresponds to a structure in FIG. 1, and FIGS. 7 and 8 correspond to a structure in FIG. 5. FIG. 9 is a voltage sweep parameter diagram of a liquid crystal antenna. It can be seen from FIG. 9 that a frequency of the liquid crystal antenna can be changed from 3.4 GHz to 6 GHz. In FIGS. 6-9, different curves denote that the widths/width of the first microstrip sub-lines and/or the second microstrip sub-line are/is different.

It should be noted that in the structures corresponding to FIGS. 7 and 8, the width of the first microstrip sub-lines is 1 mm. In the structure corresponding to FIG. 7, a width of the third microstrip sub-lines ranges from 0.4 mm-1.6 mm. In the structure corresponding to FIG. 8, a width of the third microstrip sub-lines ranges from 1 mm-3 mm.

In some embodiments, as shown in FIGS. 1, 4, and 5, lengths of the plurality of first microstrip sub-lines 7 are the same, lengths of the plurality of third microstrip sub-lines 9 are the same, and the lengths of the first microstrip sub-lines 7 are equal to the lengths of the third microstrip sub-lines 9 in the first direction X.

It should be noted that the case that the orthographic projection of the first microstrip line on the second substrate does not overlap the orthographic projection of the second microstrip line on the second substrate is illustratively described as an example in FIGS. 1-5. Certainly, during specific implementation, the orthographic projection of the first microstrip line on the second substrate may be set to overlap the orthographic projection of the second microstrip line on the second substrate.

Next, the liquid crystal antenna according to the embodiments of the present disclosure is illustratively described with the case that the orthographic projection of the first microstrip line on the second substrate overlaps the orthographic projection of the second microstrip line on the second substrate as an example.

Figure 10:
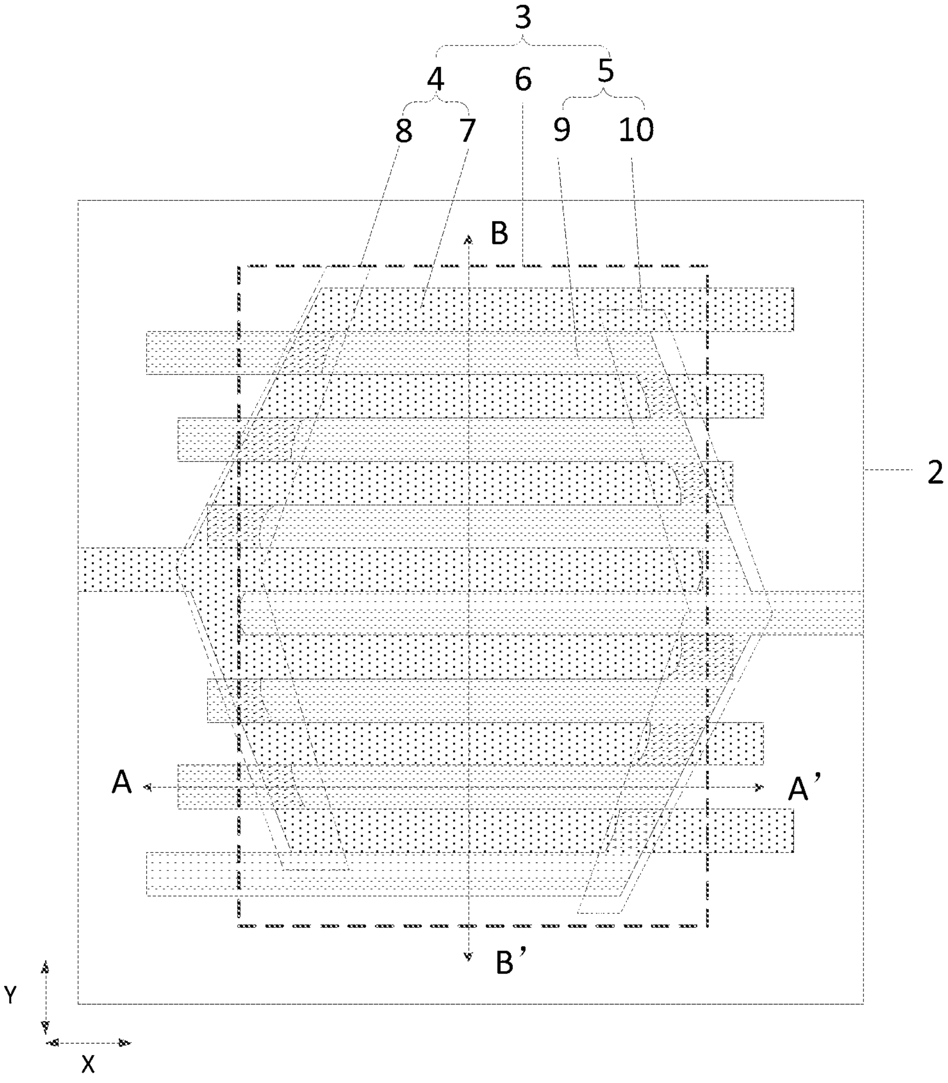
FIG. 10 is a schematic structural diagram of yet another liquid crystal antenna according to an embodiment of the present disclosure.

When the plurality of first microstrip sub-lines and the plurality of third microstrip sub-lines are alternately arranged in the second direction Y, and the orthographic projections of the first microstrip sub-lines on the second substrate do not overlap the orthographic projections of the third microstrip sub-lines on the second substrate, in some embodiments or as shown in FIG. 10, orthographic projections of some of the first microstrip sub-lines 7 on the second substrate 2 overlap the orthographic projection of the fourth microstrip sub-line on the second substrate 2; and orthographic projections of some of the third microstrip sub-lines 9 on the second substrate 2 overlap the orthographic projection of the second microstrip sub-line 8 on the second substrate 2.

Figure 15:
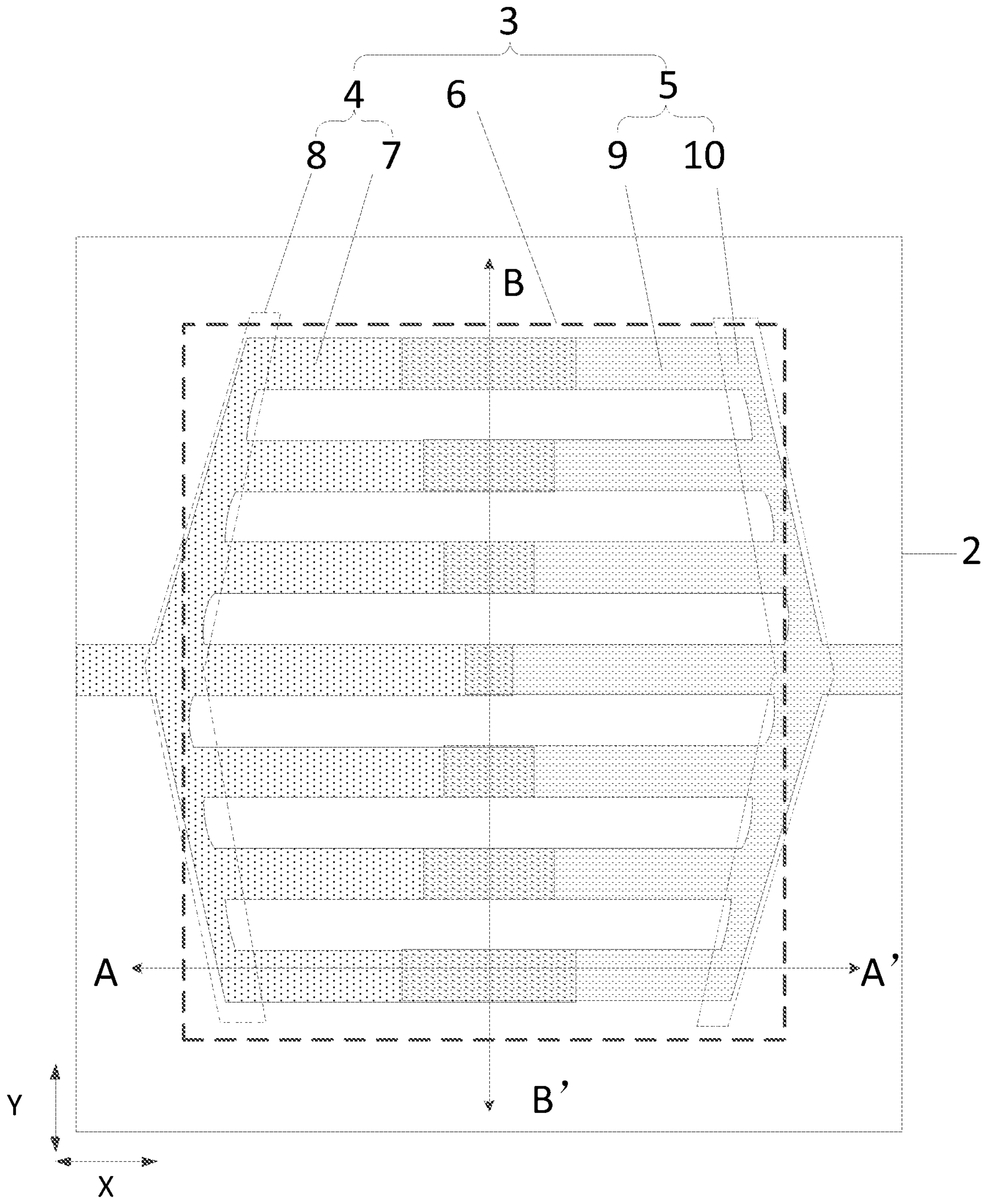
FIG. 15 is a schematic structural diagram of yet another liquid crystal antenna according to an embodiment of the present disclosure.

Certainly, in some embodiments or as shown in FIG. 15, the first microstrip sub-lines 7 and the third microstrip sub-lines 9 are arranged in parallel in the first direction X. Moreover, the orthographic projections of the first microstrip sub-lines 7 on the second substrate 2 overlap the orthographic projections of the third microstrip sub-lines 9 on the second substrate 2.

That is, at the ends of the first microstrip sub-lines in an extension direction, the first microstrip sub-lines are connected with the second microstrip sub-line. At the other ends of the first microstrip sub-lines in the extension direction, the orthographic projections of the first microstrip sub-lines on the second substrate overlap the orthographic projections of the third microstrip sub-lines on the second substrate. At the ends of the third microstrip sub-lines in an extension direction, the third microstrip sub-lines are connected with the fourth microstrip sub-line. At the other ends of the third microstrip sub-lines in the extension direction, the orthographic projections of the third microstrip sub-lines on the second substrate overlap the orthographic projections of the first microstrip sub-lines on the second substrate.

In some embodiments, as shown in FIGS. 10 and 15, the second microstrip sub-line 8 and the fourth microstrip sub-line 10 are in a non-rectilinear shape; and a side of the second microstrip sub-line 8 is bent towards the side where the first microstrip sub-lines 7 are located, and the fourth microstrip sub-line 10 is bent towards the side where the third microstrip sub-lines 9 are located.

During specific implementation, the non-rectilinear shape may be, for example, a cambered shape or a zigzag shape. The case that the second microstrip sub-line 8 and the fourth microstrip sub-line 10 are in the zigzag shape is illustratively described as an example in FIGS. 10 and 15.

Figure 20:
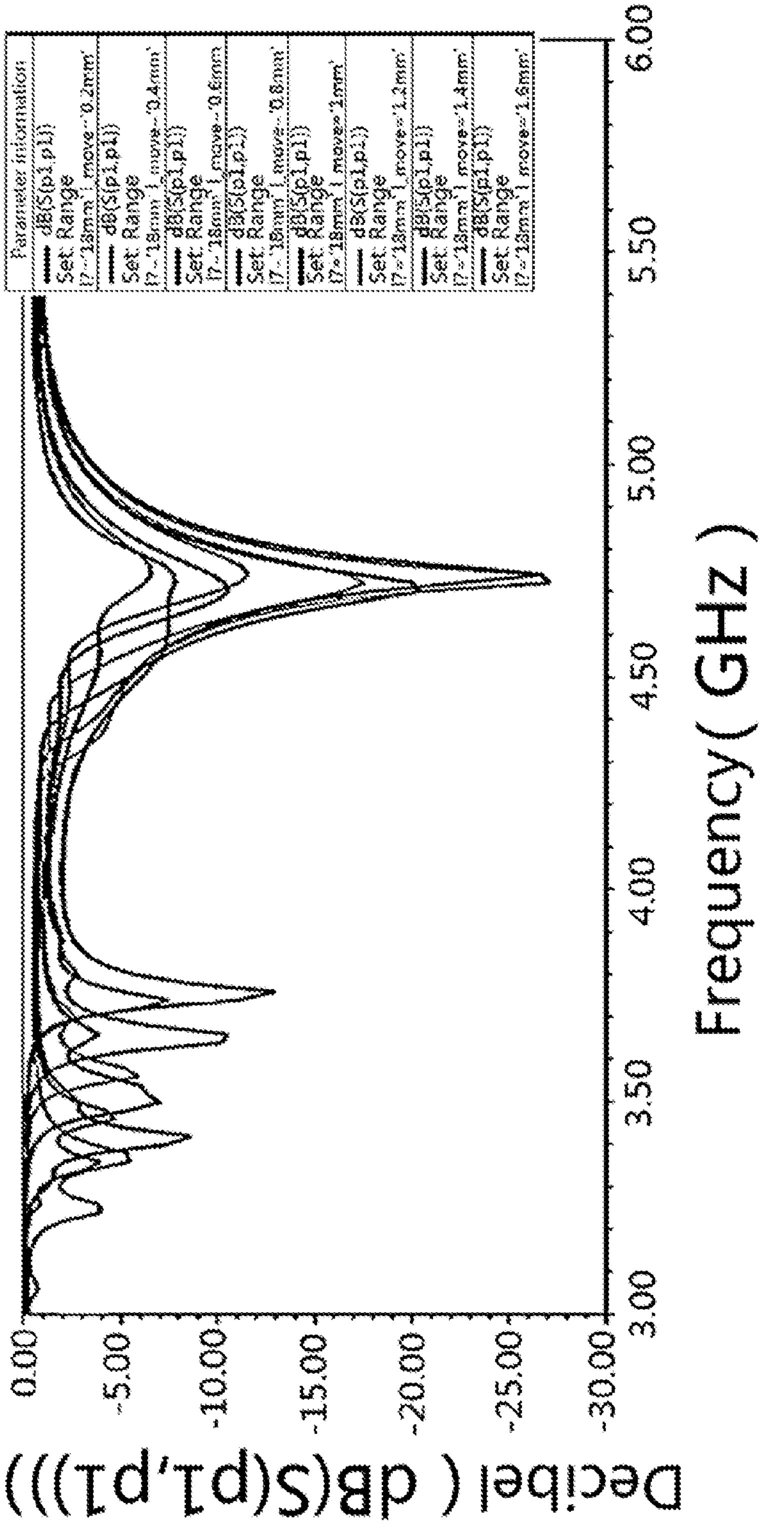
FIG. 20 is a spectrogram of a structure of a liquid crystal antenna shown in FIG. 10 according to an embodiment of the present disclosure.

A spectrogram corresponding to a structure shown in FIG. 10 is as shown in FIG. 20. When the first microstrip sub-lines and the third microstrip sub-lines are alternately arranged, and the second microstrip sub-line and the fourth microstrip sub-line are in the non-rectilinear shape, a frequency range of the liquid crystal antenna can be widened compared with the case that the second microstrip sub-line and the fourth microstrip sub-line shown in FIGS. 1, 4, and 5 are in a linear shape.

Figure 21:
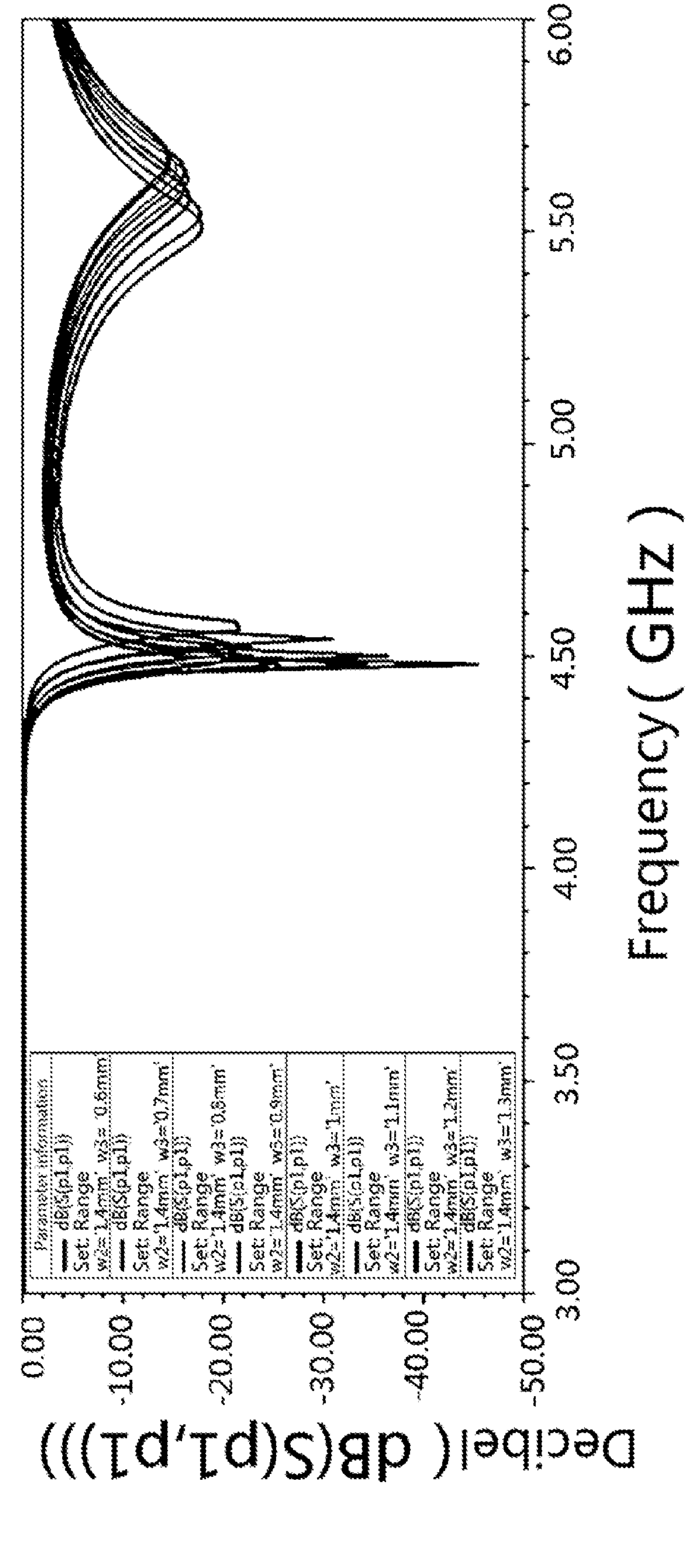
FIG. 21 is a spectrogram of a structure of a liquid crystal antenna shown in FIG. 15 according to an embodiment of the present disclosure.

A spectrogram corresponding to a structure shown in FIG. 15 is as shown in FIG. 21. When the first microstrip line and the second microstrip line are arranged in parallel, the dielectric constant of the liquid crystal can be changed by applying a voltage to the first microstrip line and the second microstrip line. However, the frequency range of the antenna structure that can be realized is relatively narrow, and a function of a reconfigurable frequency of the liquid crystal antenna can be realized only by repeatedly adjusting the voltage applied to the first microstrip line and the second microstrip line.

In some embodiments, as shown in FIGS. 11-14 and 16-19, the antenna structure further includes a first insulation layer 13; and the first insulation layer 13 is disposed between the liquid crystal layer 6 and the first microstrip line 4; and alternatively, the first insulation layer 13 is disposed between the liquid crystal layer 6 and the second microstrip line 5.

In the liquid crystal antenna according to the embodiments of the present disclosure, in the antenna structure, when the orthographic projection of the first microstrip line on the second substrate overlaps the orthographic projection of the second microstrip lines on the second substrate, the first insulation layer is arranged between the liquid crystal layer and the first microstrip line or between the liquid crystal layer and the second microstrip line. Therefore, even if the liquid crystal antenna jitters, the first microstrip line can be prevented from making contact with the second microstrip line in the presence of the first insulation layer. Accordingly, the situation that the first microstrip line and the second microstrip line are short-circuited due to contact with each other when the liquid crystal antenna jitters can be avoided, and normal work of the liquid crystal antenna can be ensured.

It should be noted that the case that the first insulation layer 13 is disposed between the liquid crystal layer 6 and the first microstrip line 4 is illustratively described as an example in FIGS. 11, 12, 16, and 17. The case that the first insulation layer 13 is disposed between the liquid crystal layer 6 and the second microstrip line 5 is illustratively described as an example in FIGS. 13, 14, 18, and 19.

Figure 11:
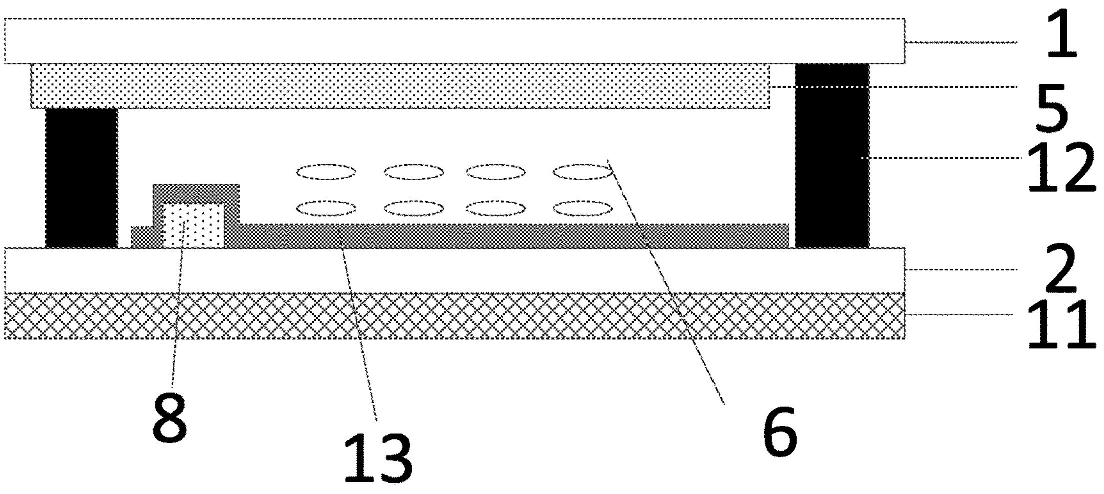
FIG. 11 is a sectional view along AA' in FIG. 10 according to an embodiment of the present disclosure.
Figure 12:
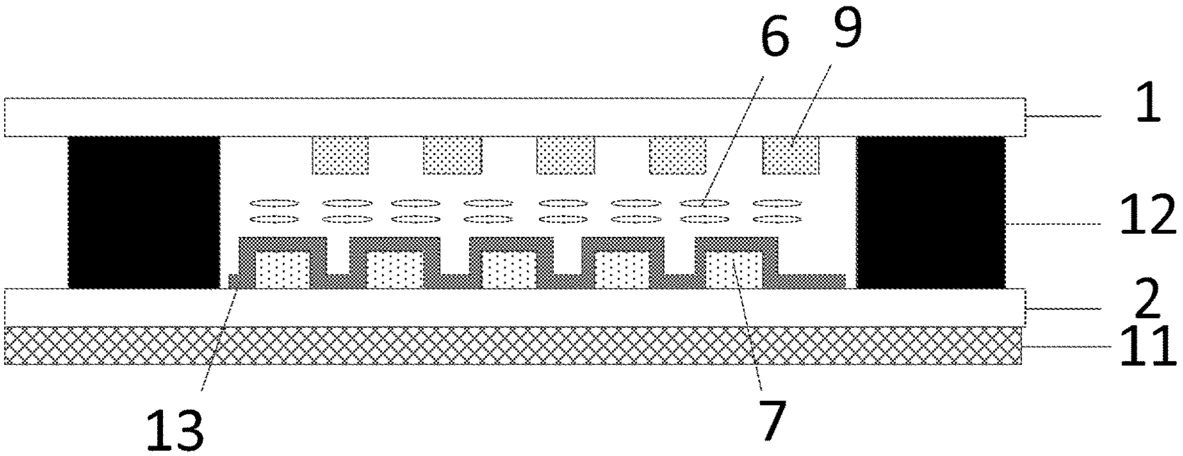
FIG. 12 is a sectional view along BB' in FIG. 10 according to an embodiment of the present disclosure.
Figure 13:
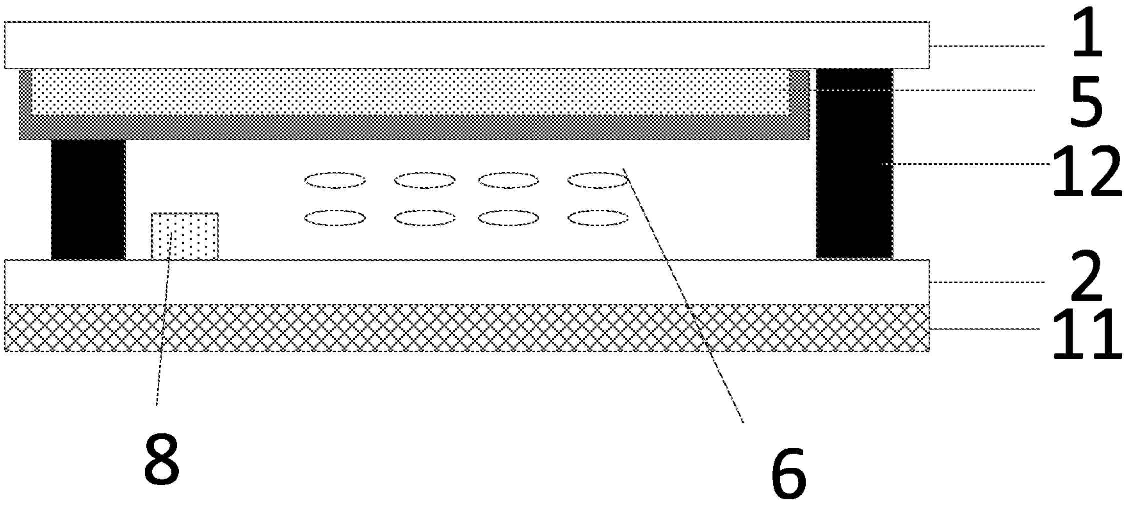
FIG. 13 is another sectional view along AA' in FIG. 10 according to an embodiment of the present disclosure.
Figure 14:
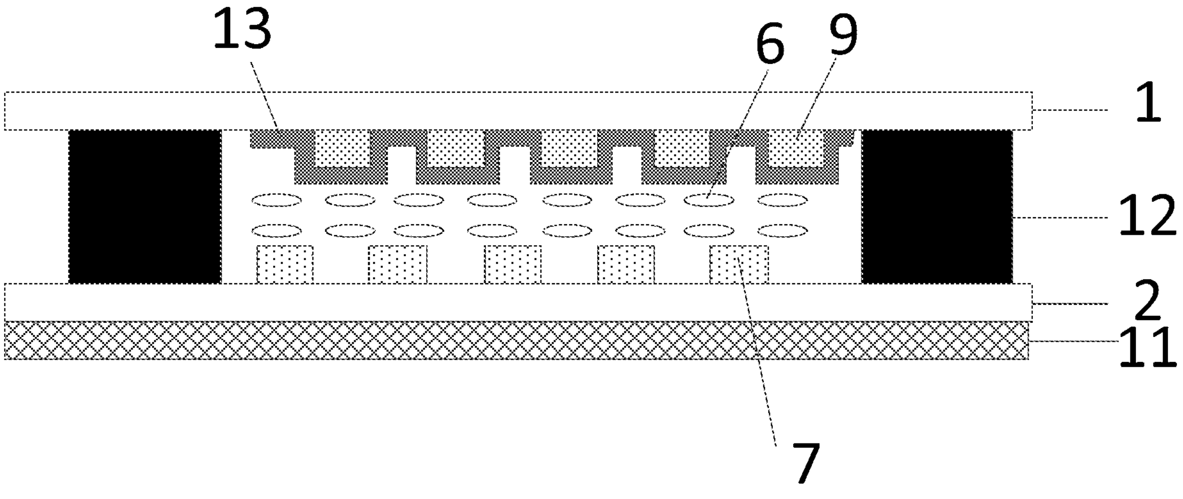
FIG. 14 is another sectional view along BB' in FIG. 10 according to an embodiment of the present disclosure.
Figure 16:
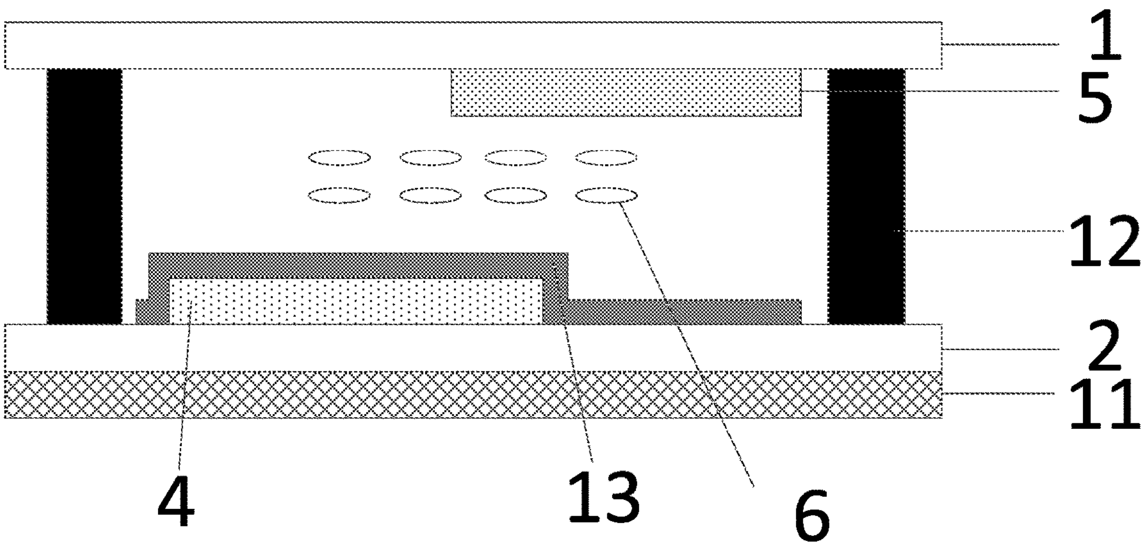
FIG. 16 is a sectional view along AA' in FIG. 15 according to an embodiment of the present disclosure.
Figure 17:
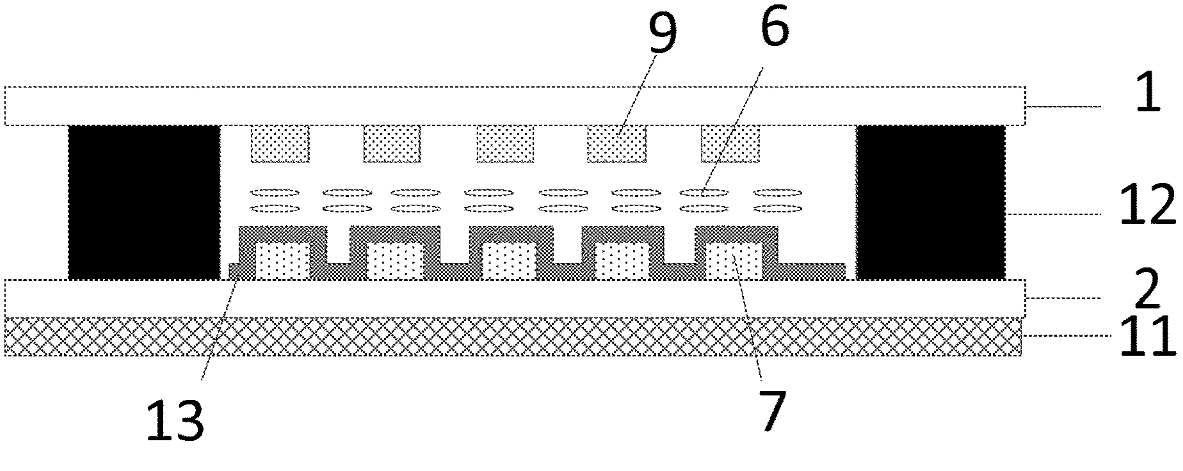
FIG. 17 is a sectional view along BB' in FIG. 15 according to an embodiment of the present disclosure.
Figure 18:
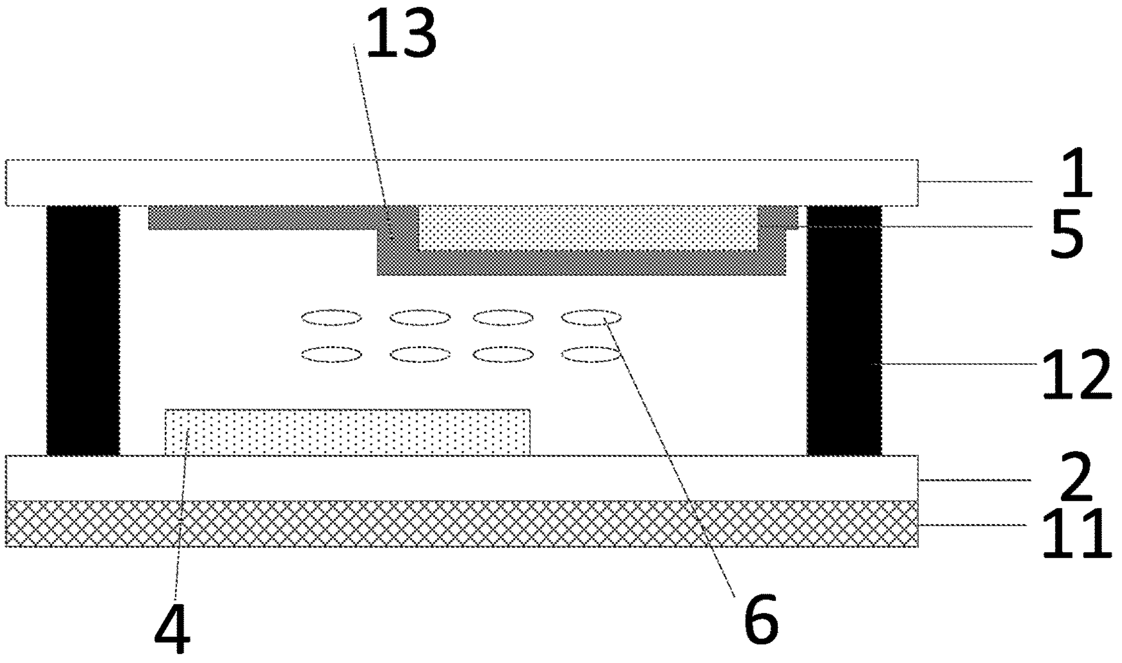
FIG. 18 is another sectional view along AA' in FIG. 15 according to an embodiment of the present disclosure.
Figure 19:
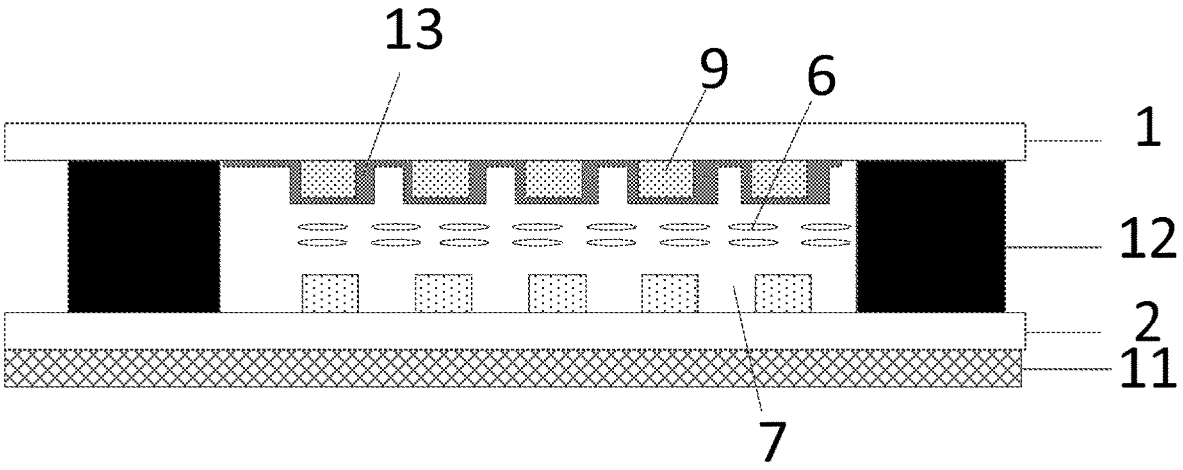
FIG. 19 is another sectional view along BB' in FIG. 15 according to an embodiment of the present disclosure.

It should be noted that FIGS. 11 and 13 may be, for example, sectional views along AA' in FIG. 10. FIGS. 12 and 14 may be, for example, sectional views along BB' in FIG. 10. FIGS. 16 and 18 may be, for example, sectional views along AA' in FIG. 15. FIGS. 17 and 19 may be, for example, sectional views along BB' in FIG. 15.

In some embodiments, as shown in FIGS. 10 and 15, the orthographic projection of the liquid crystal layer 6 on the second substrate 2 overlaps the orthographic projection of the second microstrip sub-line 8 on the second substrate 2 and the orthographic projection of the fourth microstrip sub-line 10 on the second substrate.

When the orthographic projection of the first microstrip line on the second substrate overlaps the orthographic projection of the second microstrip line on the second substrate, in some embodiments, the width of the first microstrip sub-lines is equal to the width of the third microstrip sub-lines in the second direction Y. Alternatively, in some embodiments, the width of the first microstrip sub-lines is greater than the width of the third microstrip sub-lines in the second direction Y. Alternatively, in some embodiments, the width of the first microstrip sub-lines is smaller than the width of the third microstrip sub-lines in the second direction Y.

When the orthographic projection of the first microstrip line on the second substrate overlaps the orthographic projection of the second microstrip lines on the second substrate, in some embodiments, the lengths of the plurality of first microstrip sub-lines are the same, the lengths of the plurality of third microstrip sub-lines are the same, and the lengths of the first microstrip sub-lines are equal to the lengths of the third microstrip sub-lines in the first direction X. Alternatively, in some embodiments, the lengths of the plurality of first microstrip sub-lines are not the same in the first direction X, and the lengths of the plurality of third microstrip sub-lines are not the same in the first direction X.

In some embodiments, as shown in FIGS. 2, 3, 11-14, and 16-19, the antenna structure further includes: an encapsulation structure 12 disposed between the first substrate 1 and the second substrate 2 and configured for defining an area where the liquid crystal layer 6 is located.

During specific implementation, according to a region where the liquid crystal layer needs to be set, the encapsulation structure may make contact with the first microstrip line and/or the second microstrip line in part of the region. When the antenna structure is further provided with the insulation layer, the encapsulation structure may also make contact with the insulation layer in part of the region.

In some embodiments, the encapsulation structure may also be a flexible circuit board. The embodiments of the present disclosure provide a communication device, and the communication device includes the liquid crystal antenna according to the embodiments of the present disclosure.

The communication device according to the embodiments of the present disclosure may be, for example, any product or component having a communication function, such as a mobile phone. Other essential components of the communication device should be those as understood by those of ordinary skill in the art, which will not be repeated herein, and should not be taken as limitations on the present disclosure. Reference may be made to the embodiments of the liquid crystal antenna above for implementation of the communication device, and the repetitions will not be described in detail.

In conclusion, in the liquid crystal antenna and the communication device according to the embodiments of the present disclosure, in each antenna structure, at least part of the regions of the orthographic projections of the plurality of first microstrip sub-lines on the second substrate and at least part of the regions of the orthographic projections the plurality of third microstrip sub-lines on the second substrate are covered by the orthographic projection of the liquid crystal layer on the second substrate. Moreover, in the first direction, the second microstrip sub-line connected with the plurality of first microstrip sub-lines and the fourth microstrip sub-line connected with the plurality of third microstrip sub-lines are located at two sides of the liquid crystal layer, respectively. That is, the first microstrip line and the second microstrip line are plugged into each other. During specific implementation, when a voltage is applied to the first microstrip line and the second microstrip line, an electric field formed between the plurality of first microstrip sub-lines and the plurality of third microstrip sub-lines may control a liquid crystal in the liquid crystal layer to move directionally, and a dielectric constant of the liquid crystal can be changed by adjusting a magnitude of the applied voltage. Accordingly, a resonant frequency of the antenna structure can be changed to realize an effect of a shiftable frequency, and a continuously reconfigurable resonant frequency of the liquid crystal antenna can be realized. Moreover, the short circuit of the first microstrip line and the second microstrip line caused by antenna jitter can be avoided by avoiding overlap between the orthographic projection of the first microstrip line on the second substrate and the orthographic projection of the second microstrip line on the second substrate or by arranging the first insulation layer between the first microstrip line and the liquid crystal layer or between the second microstrip line and the liquid crystal layer.

Apparently, those skilled in the art can make various modifications and variations to the present disclosure without departing from the spirit and scope of the present disclosure. Thus, if these modifications and variations to the present disclosure fall within the scope of the claims of the present disclosure and equivalent technologies thereof, the present disclosure also intends to encompass these modifications and variations.

What is claimed is:

1. A liquid crystal antenna, comprising:
- a first substrate;
- a second substrate arranged opposite the first substrate;
- a plurality of antenna structures arranged in an array and disposed between the first substrate and the second substrate; and
- a grounding electrode disposed at a side of the second substrate facing away from the antenna structures;
- wherein each of the plurality of antenna structures comprises:
  - a first microstrip line;
  - a second microstrip line disposed at a side, close to the first substrate, of the first microstrip line; and
  - a liquid crystal layer disposed between the first microstrip line and the second microstrip line; wherein
    - the first microstrip line comprises: a plurality of first microstrip sub-lines and a second microstrip sub-line connected with the plurality of first microstrip sub-lines; and
    - the second microstrip line comprises: a plurality of third microstrip sub-lines and a fourth microstrip sub-line connected with the plurality of third microstrip sub-lines; wherein
      - the plurality of first microstrip sub-lines and the plurality of third microstrip sub-lines extend in a first direction and are arranged in a second direction, and the first direction intersects with the second direction;
      - an orthographic projection of the liquid crystal layer on the second substrate covers at least part of regions of orthographic projections of the plurality of first microstrip sub-lines on the second substrate and at least part of regions of orthographic projections of the plurality of third microstrip sub-lines on the second substrate; and
      - in the first direction, at least part of a region of an orthographic projection of the second microstrip sub-line on the second substrate and at least part of a region of an orthographic projection of the fourth microstrip sub-line on the second substrate are disposed at two sides of the orthographic projection of the liquid crystal layer on the second substrate, respectively.

2. The liquid crystal antenna according to claim 1, wherein the grounding electrode is electrically connected with the first microstrip line.

3. The liquid crystal antenna according to claim 1, wherein the plurality of first microstrip sub-lines and the plurality of third microstrip sub-lines are alternately arranged in the second direction; and
- the orthographic projections of the first microstrip sub-lines on the second substrate do not overlap the orthographic projections of the third microstrip sub-lines on the second substrate.

4. The liquid crystal antenna according to claim 3, wherein the orthographic projections of the first microstrip sub-lines on the second substrate do not overlap the orthographic projection of the fourth microstrip sub-line on the second substrate, and the orthographic projections of the third microstrip sub-lines on the second substrate do not overlap the orthographic projection of the second microstrip sub-line on the second substrate.

5. The liquid crystal antenna according to claim 4, wherein the orthographic projection of the liquid crystal layer on the second substrate does not overlap the orthographic projection of the second microstrip sub-line on the second substrate and the orthographic projection of the fourth microstrip sub-line on the second substrate, and the orthographic projections of the first microstrip sub-lines on the second substrate and the orthographic projections of the third microstrip sub-lines on the second substrate fall within the orthographic projection of the liquid crystal layer on the second substrate.

6. The liquid crystal antenna according to claim 3, wherein orthographic projections of some of the first microstrip sub-lines on the second substrate overlap the orthographic projection of the fourth microstrip sub-line on the second substrate; and
- orthographic projections of some of the third microstrip sub-lines on the second substrate overlap the orthographic projection of the second microstrip sub-line on the second substrate.

7. The liquid crystal antenna according to claim 4, wherein an orthographic projection of the first microstrip sub-line on the second substrate is connected with orthographic projections of two adjacent third microstrip sub-lines on the second substrate.

8. The liquid crystal antenna according to claim 3, wherein the first microstrip sub-lines and the third microstrip sub-lines are arranged in parallel in the first direction; and the orthographic projections of the first microstrip sub-lines on the second substrate overlap the orthographic projections of the third microstrip sub-lines on the second substrate.

9. The liquid crystal antenna according to claim 1, wherein the antenna structure further comprises a first insulation layer; wherein
- the first insulation layer is disposed between the liquid crystal layer and the first microstrip line; and or, the first insulation layer is disposed between the liquid crystal layer and the second microstrip line.

10. The liquid crystal antenna according to claim 6, wherein the second microstrip sub-line and the fourth microstrip sub-line are in a non-rectilinear shape; and the second microstrip sub-line is bent towards a side where the first microstrip sub-lines is located, and the fourth microstrip sub-line is bent towards a side where the third microstrip sub-lines is located.

11. The liquid crystal antenna according to claim 10, wherein the orthographic projection of the liquid crystal layer on the second substrate overlaps the orthographic projection of the second microstrip sub-line on the second substrate and the orthographic projection of the fourth microstrip sub-line on the second substrate.

12. The liquid crystal antenna according to claim 1, wherein a width of the first microstrip sub-lines is equal to a width of the third microstrip sub-lines in the second direction.

13. The liquid crystal antenna according to claim 1, wherein a width of the first microstrip sub-lines is greater than a width of the third microstrip sub-lines in the second direction.

14. The liquid crystal antenna according to claim 1, wherein a width of the first microstrip sub-lines is smaller than a width of the third microstrip sub-lines in the second direction.

15. The liquid crystal antenna according to claim 1, wherein lengths of the first microstrip sub-lines are equal to lengths of the third microstrip sub-lines in the first direction.

16. The liquid crystal antenna according to claim 1, wherein the antenna structure further comprises:

an encapsulation structure for defining an area where the liquid crystal layer is located and disposed between the first substrate and the second substrate.

17. A communication device, comprising a liquid crystal antenna, wherein the liquid crystal antenna comprises:

a first substrate;

a second substrate arranged opposite the first substrate;

a plurality of antenna structures arranged in an array and disposed between the first substrate and the second substrate; and a grounding electrode disposed at a side of the second substrate facing away from the antenna structures;

wherein each of the plurality of antenna structures comprises:

a first microstrip line;

a second microstrip line disposed at a side, close to the first substrate, of the first microstrip line; and a liquid crystal layer disposed between the first microstrip line and the second microstrip line; wherein the first microstrip line comprises: a plurality of first microstrip sub-lines and a second microstrip sub-line connected with the plurality of first microstrip sub-lines; and the second microstrip line comprises: a plurality of third microstrip sub-lines and a fourth microstrip sub-line connected with the plurality of third microstrip sub-lines; wherein the plurality of first microstrip sub-lines and the plurality of third microstrip sub-lines extend in a first direction and are arranged in a second direction, and the first direction intersects with the second direction;

an orthographic projection of the liquid crystal layer on the second substrate covers at least part of regions of orthographic projections of the plurality of first microstrip sub-lines on the second substrate and at least part of regions of orthographic projections of the plurality of third microstrip sub-lines on the second substrate; and in the first direction, at least part of a region of an orthographic projection of the second microstrip sub-line on the second substrate and at least part of a region of an orthographic projection of the fourth microstrip sub-line on the second substrate are disposed at two sides of the orthographic projection of the liquid crystal layer on the second substrate, respectively.

18. The liquid crystal antenna according to claim 2, wherein the plurality of first microstrip sub-lines and the plurality of third microstrip sub-lines are alternately arranged in the second direction; and the orthographic projections of the first microstrip sub-lines on the second substrate do not overlap the orthographic projections of the third microstrip sub-lines on the second substrate.

19. The liquid crystal antenna according to claim 8, wherein the second microstrip sub-line and the fourth microstrip sub-line are in a non-rectilinear shape; and the second microstrip sub-line is bent towards a side where the first microstrip sub-lines is located, and the fourth microstrip sub-line is bent towards a side where the third microstrip sub-lines is located.

* * * * *